(12) United States Patent
Dalal et al.

(10) Patent No.: US 8,390,882 B2
(45) Date of Patent: Mar. 5, 2013

(54) SYSTEMS AND METHODS FOR ESTIMATING THE COLOR OF COATED PRINTS

(75) Inventors: Edul N. Dalal, Webster, NY (US); Lalit Keshav Mestha, Fairport, NY (US)

(73) Assignee: Xerox Corporation, Norwalk, CT (US)

(*) Notice: Subject to any disclaimer, the term of this patent is extended or adjusted under 35 U.S.C. 154(b) by 654 days.

(21) Appl. No.: 12/537,696

(22) Filed: Aug. 7, 2009

(65) Prior Publication Data

US 2011/0032546 A1    Feb. 10, 2011

(51) Int. Cl.
*G06F 15/00*    (2006.01)

(52) U.S. Cl. ......... 358/1.9; 358/504; 358/518; 358/520; 382/162; 382/167; 430/124.1; 430/126.1; 430/137.11; 428/32.3; 428/32.33; 428/32.36

(58) Field of Classification Search ............. 358/1.9, 358/504, 518, 520; 382/162, 167; 430/124.1, 430/126.1, 137.11; 428/32.3, 32.33, 32.36
See application file for complete search history.

(56) References Cited

U.S. PATENT DOCUMENTS

| | | | |
|---|---|---|---|
| 4,887,217 A | 12/1989 | Sherman et al. | |
| 5,764,248 A * | 6/1998 | Scarpetti | 347/2 |
| 2003/0055611 A1* | 3/2003 | Mestha et al. | 702/196 |
| 2005/0093923 A1 | 5/2005 | Busch et al. | |
| 2007/0097461 A1 | 5/2007 | Ng et al. | |
| 2009/0219554 A1* | 9/2009 | Freyer et al. | 358/1.9 |

FOREIGN PATENT DOCUMENTS

EP    1267217 A2 * 12/2002

OTHER PUBLICATIONS

Durikovic et al., Prediction of Optical Properties of Paints, Central European Journal of Physics, Central European Journals, vol. 5, No. 3m, Jan. 1, 2007, pp. 416-427.*
Dalal et al., The Effect of Gloss on Color, May 4, 1998, Color Research and Application, vol. 24, No. 5, Oct. 1999, pp. 369-376.*
Extended European Search Report and Search Opinion for European Patent Application No. 10172043.1, mailed on Nov. 3, 2010.
Ďurikovič et al., Prediction of Optical Properties of Paints, Central European Journal of Physics, Central European Journals, vol. 5, No. 3m Jan. 1, 2007, pp. 416-427.
Mestha et al., 6.3.2 Moving Matrix Interpolation, Control of Color Imaging Systems, May 27, 2009, pp. 267-269.
Dalal et al., The Effect of Gloss on Color, May 4, 1998, COLOR rsearch and application, vol. 24, No. 5, Oct. 1999, pp. 369-376.

* cited by examiner

*Primary Examiner* — Jacky X Zheng
(74) *Attorney, Agent, or Firm* — Pillsbury Winthrop Shaw Pittman, LLP

(57) ABSTRACT

A method for estimating the color of a coated print includes: measuring the color of an uncoated print with a color measuring device; and estimating the color of the print when coated by a coating process based on the uncoated color measurement using a function that correlates uncoated color measurements and coated color measurements; and adjusting at least one parameter of the printing process based on the coated color estimation. The correlating function may be derived by measuring the color of a plurality of uncoated color patches; measuring the color of the plurality of patches after the patches have been coated by the coating process; and correlating the color of the coated patches with the uncoated patches based on the coated and uncoated color patch measurements.

26 Claims, 3 Drawing Sheets

SYSTEMS AND METHODS FOR ESTIMATING THE COLOR OF COATED PRINTS

FIELD

This application generally relates to coated color prints, and in particularly, estimating the color of a coated print based on a color measurement of the print before the coating is applied.

BACKGROUND

Clear coatings are commonly applied to printed matter to improve its appearance, as well as to protect it from scuffs, scratches, moisture, high temperatures, etc. Varnish, aqueous and ultraviolet (UV) coatings, for instance, are widely used in commercial printing. These clear coatings may be applied to an entire page to enhance and protect the page or can be applied to selected sections of the page to draw attention to those sections. Alternatively, lamination may be applied in some cases instead of coating, but serves the same purpose. These coatings or laminations are available in a range of gloss levels, from very glossy to very matte.

The clear coat finishes may change the color of the underlying printed image. For example, glossy finishes typically provide a significant increase in image chroma. This may be a very desirable outcome, and is, in many cases, the main reason for choosing to apply the coating despite the increased cost. However, this color change may be a problem for accurate color rendition.

Inline color measurements are typically made of prints to ensure accurate color rendition. For example, an inline spectrophotometer (ILS) may be located at the output end of a color digital printing presses, such as the Xerox Corp. iGen4®, to automate creation of destination profiles, spot color recipe selection, etc.

Coating or laminating systems may be fabricated or provided by after-market or third-party suppliers that are used inline or offline with the color presses. Since the coating or laminating may significantly alter the appearance of the color of the prints output by the press, the ability of the press to deliver accurate color to coated prints may be compromised. This is because the prints are altered by the coating prints after the prints have been sensed by the ILS.

Moreover, many print shops may not have their own coating and laminating equipment, and may have that work performed by a different shop. As a result, color adjustments have to be made well before the prints are coated, for instance, a day or two later, and therefore cannot properly correct for color inconsistency.

This may result in a failure to meet customers' color requirements, especially when images include specific spot colors, such as logo colors or user-defined colors.

U.S. patent application Ser. No. 12/143,030, herein incorporated by reference in its entirety, discloses an apparatus and method for controlling the color of clear coated images on media. The apparatus may include a sensor configured to measure color attributes of the clear coated image and to provide color information of the clear coated image. The controller can be configured to determine a difference between the color information of the clear coated image and the reference color information, and can adjust the image output settings according to the difference between the color information and the reference color information to achieve adjusted image output settings.

Also U.S. patent application Ser. No. 12/274,846, herein incorporated by reference in its entirety, discloses a system and method for generating a destination printer profile for coated images using measured color attributes associated with the printed and coated color patches and modifying the initial printer profile for the target colors as a function of the error to generate a new destination printer profile to produce the desired color after coating the printed images.

In both of these applications, it is necessary to measure the color of the printed samples after coating. As discussed above, this is often not feasible in practice.

SUMMARY

According to one embodiment, a method for estimating the color of a coated print comprises: measuring the color of an uncoated print with a color measuring device; estimating the color of the print when coated by a coating process based on the uncoated color measurement using a function that correlates uncoated color measurements and coated color measurements; and adjusting at least one parameter of the printing process based on the coated color estimation.

According to another embodiment, a system configured to estimate the color of a coated print comprises: a marking engine configured to render a color print; a sensor configured to measure the color of an uncoated print; and a processor configured to (i) estimate the color of the print when coated by a coating process, based on the uncoated color measurement, using a function that correlates uncoated color measurements and coated color measurements; and (ii) adjust at least one parameter of the printing process based on the coated color estimation.

Other features of one or more embodiments of this disclosure will be apparent from the following detailed description, and accompanying drawings, and the appended claims.

BRIEF DESCRIPTION OF THE DRAWINGS

Embodiments of the present disclosure will now be disclosed, by way of example only, with reference to the accompanying schematic drawings in which corresponding reference symbols indicate corresponding parts, in which.

DETAILED DESCRIPTION

According to one or more embodiments, a methodology for estimating the effect of a coating process on a color of a print is provided. At least one parameter of the printing process may then be adjusted based on the coated color estimation. In particular, the methodology may predict or estimate the color of images after coating, based on color measurements of the printed color before the coating is applied. In some implementations, a spectral space transformation model or a physics-based model may be utilized for such correlation. Other correlating functions and algorithms may also be used. As a result, in some implementations, additional sensor(s) configured for measuring the color of coated prints may be eliminated, thus reducing costs and additional sensing steps, without significant loss of color rendition accuracy.

The term "color" as used herein may also include monochrome or grayscale image data as well.

Figure 1:
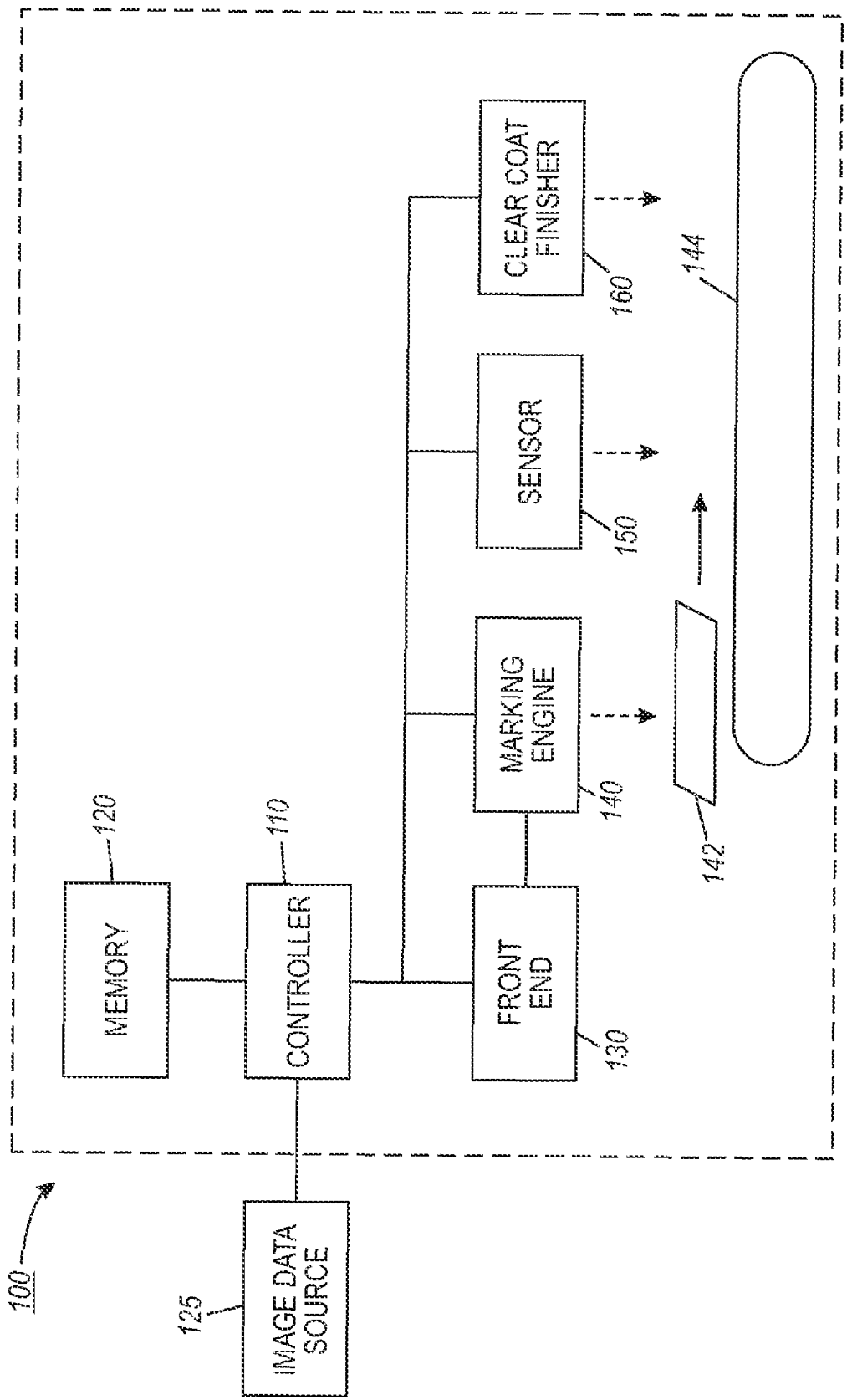
FIG. 1 shows an exemplary printing system which includes a coating apparatus in accordance with an embodiment.

FIG. 1 shows an exemplary printing system 100 which includes a coating apparatus in accordance with an embodiment.

The printing system 100 may include a controller 110 configured to control operations of the printing system 100. The printing system 100 may include a memory 120 coupled to the controller 110, where the memory 120 may include reference color information corresponding to a desired color of an output image. The image file can be received from an image data source 125, such as a personal computer, an image workstation, a scanner, a network, a flash memory card, or any other source for image data. The reference color information can include L*a*b* information or other reference color information corresponding to a desired color of an output image on media.

The printing system 100 may include a digital front end (DFE) 130 configured to provide a marking engine 140 with control signals corresponding to the desired color of the output image. The controller 110 may be located within the front end 130, or alternatively, the front end 130 may be located within the controller 110. The control signals may include device-specific print information, such as, cyan, magenta, yellow, and black (CMYK) information, hexachromatic information, or any other information useful for instructing a marking engine to output an image on media.

The marking engine 140 may be coupled to the front end 130 which is configured to generate an image on print media 142 responsive to the marking engine control signal using image output settings. For example, the color marking engine 140 may be configured to generate an image on the media 142 as the media 142 is transported along a media transport 144. Various color marking engines 140 may be used, such as for example, ink-jet (bubble jet), laser, offset, solid-ink, dye sublimation, xerography, etc.

The media 142 may be any printable substrate, such as paper, parchment, a transparency, cardboard, film, foil, or any other printable media. The color marking engine 140 may be configured to render an image having at least one test patch on the media 142 using the image output settings, where the at least one test patch can include a color of interest.

The printing system 100 may include a sensor 150 configured to measure color attributes of the media 142. The sensor 150 may be coupled to the controller 110. The sensor 150, for instance, may be a spectrophotometer or any other color sensor configured to measure color attributes of the image to provide color information.

As shown, the sensor 150 may be an embedded on inline sensor which is provided in the printing system 100 downstream of the marking engine 140 to increase productivity. In one implementation, a spectrophotometer sensor may be configured to measure the wavelength of light reflected off the media 142. The spectrophotometer sensor can measure light intensity as a function of the color of an image on the media 142. The color information of the image may include L*a*b* values. The controller 110 may be configured to determine a difference between the color information of the clear coated image and reference color information and configured to adjust the image output settings according to the difference between the color information and the reference color information to achieve adjusted image output settings. Of course, in other implementations, offline sensors could also be used.

The printing system 100 may also include a coating apparatus or finisher 160 configured to coat the image on the media 142 with a coating. The coating apparatus 160 may be coupled to the controller 110.

The coating apparatus 160 may be configured to apply an ultraviolet (UV) clear coat, an aqueous clear coat, or any other clear coat. For example, the coating apparatus 160 may coat the output image on the media 142 with a clear coat finish by coating media including the output image with a liquid and curing the coated media using ultraviolet light to create a clear coated output image on media. The output image on the media 142 may be spot coated in selected areas to accent a particular portion of the media 142 or may be flood coated to cover all of the media 142. The clear coat finish can also be any other coating that can coat an image on media. In some implementations, the clear coat finish may be a laminate clear coat finish that can be applied to an output image on the media 142 in a process separate from the printing system 100 or in a process coupled to the printing system 100. Other coating processing may also be used.

The coating apparatus 160 may be inline or embedded with the marking engine 140. Although, it will be appreciated that the coating apparatus 160 may be offline from the marking engine 140. For instance, in some implementations, the coating apparatus 160 may be at a different shop or location altogether from the marking engine 140.

The embodiments can be used with any device that can produce a color output image on media, such as a printer, facsimile, copier, multifunctional device, a Tightly Integrated Parallel Printer (TIPP) machine, or any other device that can produce a color output image on media. For example, a TIPP machine can have many integrated marking engines that can operate together as a single printer. In some uses, one marking engine can produce an image on one side of media while another marking engine produces an image on the other side of the media. Each marking engine on a TIPP machine can be addressed by a front end that can iteratively adjust image output settings of the marking engines according to a difference between measured color information of a coated image and reference color information to achieve desired image output settings.

Figure 2:
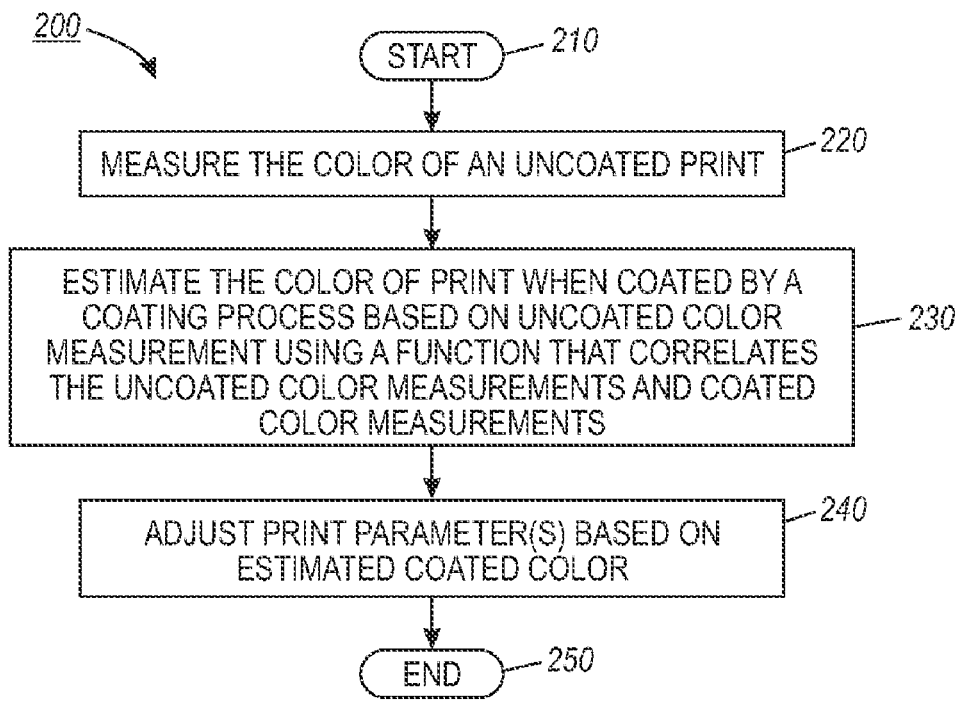
FIG. 2 shows a method for estimating color of coated prints in accordance with an embodiment.

FIG. 2 shows a method 200 for estimating color of coated prints in accordance with an embodiment. The method begins in step 210.

In step 220, an uncoated color print is measured. The print may be rendered by the marking engine 140 (FIG. 1) and measured using sensor 150 prior to passing through the coating apparatus 160.

Continuing to step 230, the color of print when coated by a coating process may be estimated based on the uncoated color measurement. This may be performed using a function that correlates uncoated color measurements and coated color measurements by the clear-coating process. Various color models and/or empirical lookup tables (LUT) may be implemented to predict or estimate the effect of coating on image color. While two types of correlation functions are disclosed herein, it will be appreciated that other such functions are also possible.

Based on the estimated color of the coated print, in step 240, one or more parameters of the printing process may be further adjusted to ensure proper color rendering, prior to coating. Methods for adjusting the color of coated prints are disclosed, for example, in U.S. patent application Ser. Nos. 12/274,846 and 12/143,040, mentioned above. The method ends in step 250.

Figure 3:
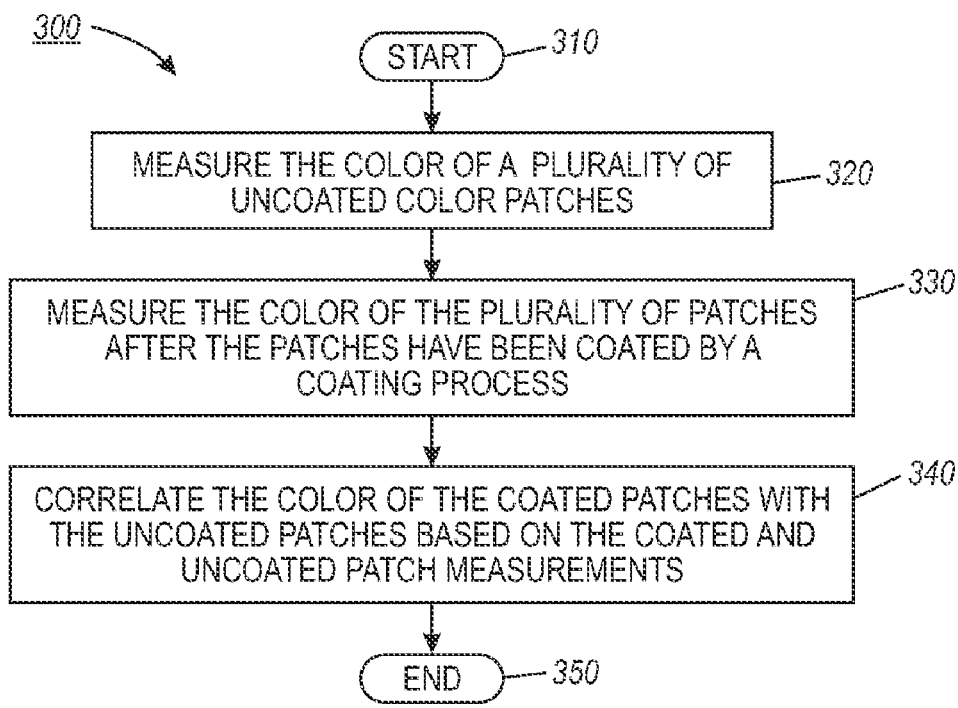
FIG. 3 shows a method for correlating uncoated color measurements and coated color measurements in accordance with an embodiment.

FIG. 3 shows a method 300 for correlating uncoated color measurements and coated color measurements in accordance with an embodiment.

This correlation process will result in building a color model of the coating apparatus. The color model may be stored in memory 120 (FIG. 1) of the printer. This may be a one time process, for instance, when a printer is manufactured or shipped. Of course, the process may be performed periodically, for instance, when using a different coating apparatus 160 with the marking engine 140.

A calibrating system (not shown) may be used to build the color model. The calibration system may include a sensor configured to measure the color of a plurality of uncoated color patches; a sensor configured to measure the color of the plurality of patches after the patches have been coated by the coating process; and a processor configured to correlate the color of the coated patches with the uncoated patches based on the coated and uncoated color patch measurements. The calibrating system may be a separate system from the printing system 100. Although, in some implementations, it may use some of the same components of the printing system 100, such as, the marking engine 140 and the coating apparatus 160.

The method begins in step 310. In step 320, a plurality of uncoated color patches are measured. For instance, a color measurement sensor, such as an X-Rite 938, iSis or DTP70 Autoscan spectrophotometer may be used. Other color sensors may also be used. In some implementations, the sensor may be an inline sensor (ILS) which is provided in the printer to increase productivity.

Next in step 330, the color patches are measured after having been coated by the coating process. A similar sensor as the one used in step 320, or the same one, may be utilized. Continuing to step 340, the color of the coated patches is correlated to the color of the uncoated patches based on the coated and uncoated color measurements thereof. Various correlating algorithms and methods may be used, including but not limited to those discussed herein. That is, for each color patch, the measured uncoated color and the measured coated color are correlated, for instance, in a lookup table (LUT) and/or by algorithmic modeling which will be made apparent from the following detailed descriptions. The method ends in step 350.

Multi-Dimensional Single Transformation in Spectral Space:

In one embodiment, the reflection spectra of the coated color prints $S_c$, and the reflection spectra of the uncoated color prints $S_p$ may be correlated using a spectral transformation matrix $M^*$. Equation 1 shows one correlating function based on a matrix model.

$$S_c = M^* S_p \quad (1)$$

The matrix $M^*$ may be determined a priori, and stored, for instance, in memory 120 (FIG. 1).

In order to determine the transformation matrix $M^*$, a plurality of color samples or patches may be printed and measured before and after coating. The patches may be coated, for example, by using a UV coater or other clear-coating process mentioned above.

A database of a plurality of spectral pairs may be constructed and stored. For instance, $S_c^i$ and $S_p^i$ may be the measured spectra from the reference instrument for the coated samples and for the uncoated samples, respectively, for the i th patch. The more color samples considered the more accurate the transformation matrix may be. For instance, the inventors considered the extended IT8.7/3 color data set of 928 patches.

In one implementation, the transformation matrix $M^*$ may be 31×31 in size. When the reflectance spectra of the samples are at 10 nm wavelength increments, in a wavelength range between 400 nm to 700 nm (a predominantly visible spectral range), this results in a total of 31 wavelengths with a matrix of size 31×31. Other wavelength ranges and increments may also be used, with corresponding adjustment of the matrix size.

The transformation matrix $M^*$ may be determined using the following weighted least square error minimization according to Equation 2.

$$M^* = \underset{M}{\mathrm{argmin}}\, J = \underset{M}{\mathrm{argmin}} \sum_{i=1}^{N} w(i) \| S_c^i M S_p^i \|^2 \quad (2)$$

where $$w(i) = \frac{1}{d(i)^p + \varepsilon}; \quad d(i) = \| S_c^i - S_p^i \|$$

In Equation 2, p may be a small positive number (e.g. 4) and epsilon $\varepsilon$ may be a very small positive number (e.g., 0.0001).

The solution to the matrix $M^*$ may be obtained, in one implementation, by setting the gradient of J with respect to M equal to zero. This results in Equation 3:

$$M^* = QP^{-1} \quad (3)$$

where $$Q = \sum_{i=1}^{N} w(i) S_c^i S_p^{iT} \text{ and } P = \sum_{i=1}^{N} w(i) S_p^i S_p^{iT}$$

The number of elements in the matrix $M^*$ may be increased further, if necessary by considering affine, quadratic and cubic terms. Increasing the matrix size means adding more parameters, which may in some cases have negative effects on the model's ability to predict the color after coating. Hence proper statistical tests (e.g., R-Square, Adjusted R-Square, F-Value, F-Lack-Of-Fit, etc.) may be used to minimize number of parameters and improve the model's prediction performance.

Physics-Based Models

There are several discrete physical aspects that may contribute to the overall color change after coating. These may include, but are not limited to, a change in image gloss and an absorption in the coating layer.

A change in image gloss may result in an offset in the diffuse reflectance spectrum, the magnitude of which is a function of the roughness as well as the refractive index of the coating. Typically, the coating is very smooth and increases the image gloss. In that case, the offset in diffuse reflectance is negative, i.e., less light is reflected to the sensor. The offset can be wavelength-dependent, though this dependence is usually weak for the clear polymeric coatings typically used, at least within the visible spectrum which is of interest for this work. Consequently, the effect of gloss change may be modeled by a wavelength-dependent offset in the reflectance spectrum, this offset being independent of the image color. Equation 4 describes a gloss model with a wavelength-dependent offset.

$$R_G(\lambda) = R_U(\lambda) + \Delta R(\lambda) \quad (4)$$

$R_G(\lambda)$ and $R_U(\lambda)$ are the reflectance spectra of the image with and without the effect of coating-enhanced gloss, respectively, and $\Delta R(\lambda)$ is the offset due to gloss change, at wavelength $\lambda$.

Although the coating should ideally be totally clear, in practice there is usually some measurable amount of absorption present. This absorption may be characterized according to Beer's law as shown by Equation 5:

$$R_A(\lambda)=R_N(\lambda)\cdot\exp(-2\times K(\lambda)) \quad (5)$$

$R_A(\lambda)$ and $R_N(\lambda)$ are the reflectance spectra of the image with and without coating absorption respectively, and $K(\lambda)$ is the absorption spectrum of the coating, at wavelength $\lambda$. The coating film thickness, x, may usually be assumed constant for a given coating process.

The two components described above may be combined into an overall model for the coated print sample according to Equation 6:

$$R_C(\lambda)=R_U(\lambda)\cdot\exp(-2\times K(\lambda))+\Delta R(\lambda) \quad (6)$$

$R_C(\lambda)$ and $R_U(\lambda)$ are the reflectance spectra of the print sample with and without the coating, respectively, at wavelength $\lambda$.

This equation may be rewritten as Equation 7 as follows:

$$R_C(\lambda)=R_U(\lambda)\cdot A(\lambda)+B(\lambda) \quad (7)$$

$A(\lambda)$ and $B(\lambda)$ are experimentally-determined spectra (or they may be estimated from physical properties). $A(\lambda)$ and $B(\lambda)$ may be determined, for example, by printing and measuring the reflectance spectra of a number of color patches before and after coating, and fitting the measured spectra to Equation 7. In some implementations, a relatively small number of color patches is sufficient. For more accurate results, the patches should be distributed over the color gamut of the printer.

The reflectance spectrum of any print sample after coating, $R_C(\lambda)$, may be then calculated from the reflectance spectrum of that print sample before coating, $R_U(\lambda)$ and the experimentally-determined (or estimated from physical properties) spectra $A(\lambda)$ and $B(\lambda)$.

In some implementations, if computational power is limited, this model may be simplified to a "two-constant model" as shown in Equation 8:

$$R_C(\lambda)=a\cdot R_U(\lambda)+b \quad (8)$$

a and b are scalar constants, which may be determined experimentally or estimated from physical properties.

In some implementations, this model may be further simplified, for instance, if computational power is very limited, and/or if a colorimeter is used instead of a spectrophotometer. For instance, a less accurate but still useful correction may be applied by ignoring the absorption effect and approximating the gloss effect according to Equation 9.

$$X_C=X_U+X_G$$

$$Y_C=Y_U+Y_G$$

$$Z_C=Z_U+Z_G \quad (9)$$

$X_U$, $Y_U$, and $Z_U$ are the tristimulus values of the uncoated sample, $X_C$, $Y_C$, and $Z_C$ are the tristimulus values of the coated sample, and $X_G$, $Y_G$, and $Z_G$ are three experimentally-determined scalar constants.

It is preferable that the tristimulus values (XYZ) are used, rather than uniform color space (e.g., L*a*b* space) values. This is because the former are linear in reflectance, where the offset correction is to be applied, while the latter are not. Transformations from L*a*b* values to tristimulus values, and vice versa, may be performed using standard CIE formulas.

The spectral model has 2n parameters, where n is the number of wavelengths measured. Commonly, wavelengths are measured from 400 nm to 700 nm at 10 nm increments, in that case n=31, and 62 independent parameters would be used in computing the color correction. Using the two-constant model, only 2 parameters would be used. This makes computation simpler and faster, and moreover, fewer test samples would be needed to experimentally derive the parameters, and there would generally be better robustness to noise in the printer and measurement system. However, the color prediction accuracy may be less accurate.

It is possible to use other models which are intermediate between the extremes of the spectral model and the two-constant model. One way to derive such intermediate models would be to use simple functional forms relating $A(\lambda)$ and $B(\lambda)$ to $\lambda$. These simple functional forms could be, for example, linear or quadratic functions, examples of which are shown in Equation 10.

$$A(\lambda)=a_0+a_1*\lambda+a_2*\lambda^2$$

$$B(\lambda)=b_0+b_1*\lambda \quad (10)$$

In one implementation, the simple functions may be polynomials of order 0, 1 or 2. Alternatively, it is possible to use a spectrum for one of $A(\lambda)$ and $B(\lambda)$ and a constant or simple functional form for the other.

Tests were preformed by the inventors using the physics-based compensation models described above. The testing was performed using the "Color Swatch Guide 1$^{st}$ edition," published by 4OVER, Inc. Trade Printshop.

This is a color swatch book that contains swatches with various CMYK recipe values. On the last page of this book is a set of five color swatches (i.e., "Black," "Green," "Yellow," "Red," and "Blue"). Half of each swatch is Spot UV coated, while the other half is uncoated. The coated half of each swatch is of significantly higher gloss than the uncoated half.

The reflectance spectra of each these five color swatches, coated and uncoated, were measured. Then, some of the physics-based models described above were fitted to the measured data. These included the spectral model (Equation 7) and the two-constant model (Equation 8).

If no correction is applied (i.e., if the uncoated spectra measured during the printing process are used as-is) the color errors can be quite large, as shown in Table 1.

TABLE 1

Color error if no correction is applied

| Swatch color | Uncoated, measured | | | Coated, measured | | | | |
| --- | --- | --- | --- | --- | --- | --- | --- | --- |
| | L* | a* | b* | L* | a* | b* | dE | dE00 |
| Black | 16.0 | 0.0 | 0.1 | 9.4 | 1.1 | 0.0 | 6.7 | 4.5 |
| Green | 39.4 | −35.0 | 15.6 | 37.0 | −37.2 | 16.5 | 3.4 | 2.3 |
| Yellow | 89.5 | −1.0 | 66.0 | 88.5 | 0.2 | 70.7 | 4.9 | 1.5 |
| Red | 45.4 | 69.7 | 39.9 | 44.1 | 72.9 | 45.1 | 6.2 | 2.2 |
| Blue | 30.3 | −9.8 | −37.7 | 27.6 | −11.4 | −38.7 | 3.4 | 2.4 |
| | | | | | | Avg = | 4.9 | 2.6 |
| | | | | | | P95 = | 6.6 | 4.1 |

Using the reflectance spectra of the uncoated swatches and the fitted parameters, the reflectance spectra of the coated swatches, and hence their color, were predicted. The errors between the predicted and measured color of the coated swatches were then determined.

The two-constant model of Equation 8 requires only two experimentally-determined scalar constants a and b. These were determined by a linear regression between the reflectance data (regardless of wavelength) of the coated and uncoated swatches.

Figure 4:
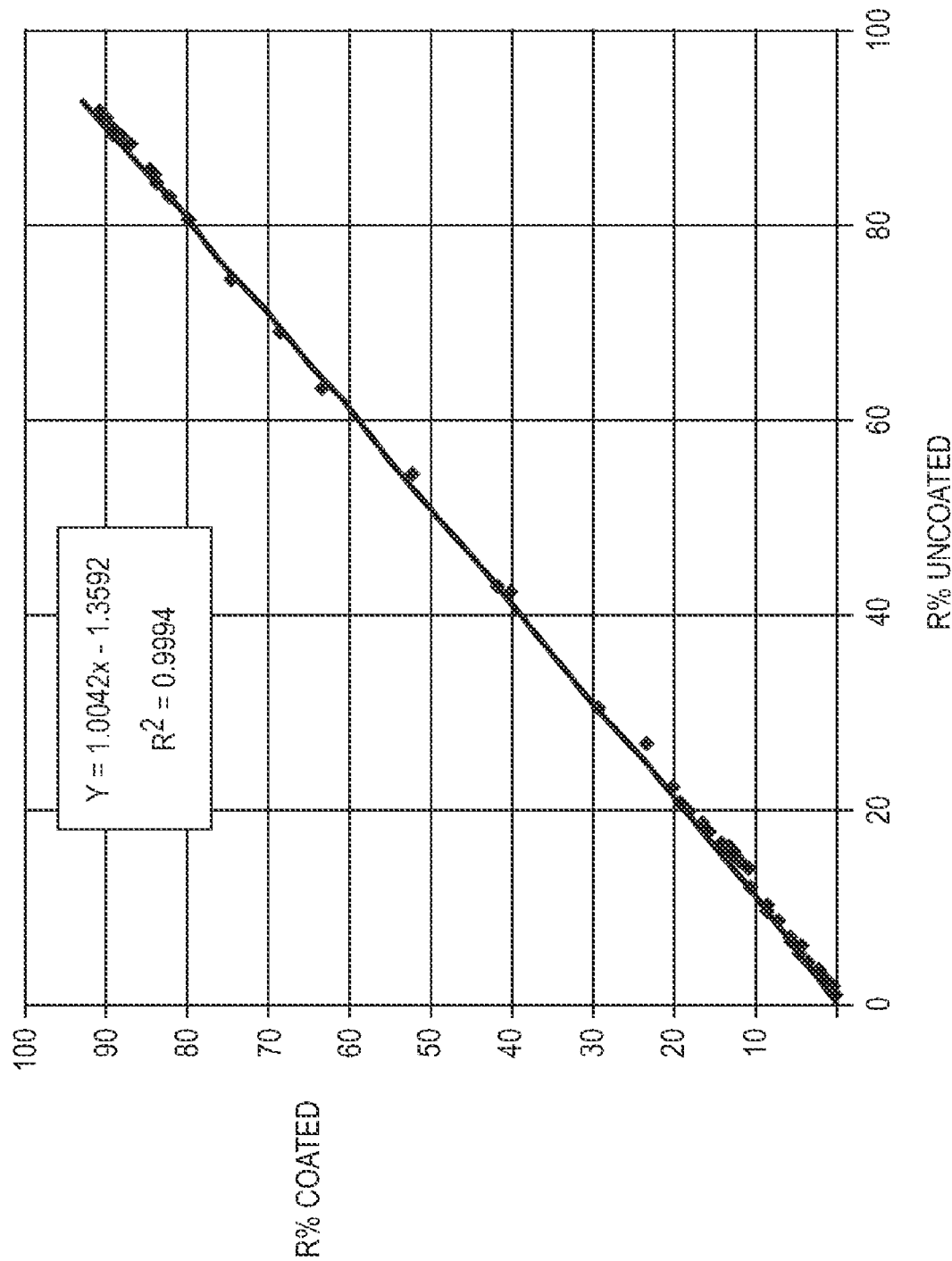
FIG. 4 shows a plot of reflectance data for coated and uncoated color swatches.

FIG. 4 shows a plot of reflectance data for coated and uncoated swatches. A linear regression (best-fit) was applied to the reflectance data showing a correlating function between coated and uncoated color. The linear regression determined the parameters of a and b to be about 1.0042 and −1.36, respectively. The correlation coefficient $R^2$ of the fit was extremely good at 99.94%.

The spectral model of Equation 7 requires two experimentally-determined spectra $A(\lambda)$ and $B(\lambda)$. These spectra were determined by a linear regression between the reflectance data of the coated and uncoated swatches, at each wavelength. The spectral model provides an accurate prediction of the data, and should be adequate for virtually all clear coated color applications. Table 2 shows experimentally-determined values for $A(\lambda)$ and $B(\lambda)$ for the color swatches.

TABLE 2

Spectra $A(\lambda)$ and $B(\lambda)$ for the color swatches

| λ | A(λ) | B(λ) |
|---|---|---|
| 400 | 0.654 | −0.331 |
| 410 | 0.799 | −0.454 |
| 420 | 0.891 | −0.705 |
| 430 | 0.921 | −0.800 |
| 440 | 0.928 | −0.866 |
| 450 | 0.923 | −0.915 |
| 460 | 0.920 | −0.907 |
| 470 | 0.916 | −0.863 |
| 480 | 0.912 | −0.796 |
| 490 | 0.926 | −0.771 |
| 500 | 0.965 | −1.031 |
| 510 | 0.983 | −1.218 |
| 520 | 0.981 | −1.166 |
| 530 | 0.978 | −1.065 |
| 540 | 0.977 | −0.999 |
| 550 | 0.976 | −0.982 |
| 560 | 0.975 | −0.990 |
| 570 | 0.974 | −1.002 |
| 580 | 0.978 | −1.004 |
| 590 | 0.994 | −0.963 |
| 600 | 1.008 | −0.970 |
| 610 | 1.013 | −1.032 |
| 620 | 1.013 | −1.070 |
| 630 | 1.011 | −1.064 |
| 640 | 1.010 | −1.068 |
| 650 | 1.010 | −1.069 |
| 660 | 1.009 | −1.060 |
| 670 | 1.009 | −1.052 |
| 680 | 1.009 | −1.052 |
| 690 | 1.009 | −1.049 |
| 700 | 1.009 | −1.064 |

Table 3 shows the predicted color and the measured color of the clear-coated swatches using the spectral model. The color data is presented in L*a*b* color space for the uncoated and coated measurement data as well as the predicted color for the coated swatches. The error for each swatch between the predicted and the measured values is also provided, in both delta-E 1976 (dE) and average delta-E 2000 (dE00). The average Avg and 95 percentile P95 values are also provided.

TABLE 3

Color prediction performance of the spectral model

| Swatch color | Uncoated, measured | | | Coated, measured | | | Coated, predicted | | | dE | dE00 |
|---|---|---|---|---|---|---|---|---|---|---|---|
| | L* | a* | b* | L* | a* | b* | L* | a* | b* | | |
| Black | 16.0 | 0.0 | 0.1 | 9.4 | 1.1 | 0.0 | 9.4 | 1.2 | −0.2 | 0.3 | 0.3 |
| Green | 39.4 | −35.0 | 15.6 | 37.0 | −37.2 | 16.5 | 37.2 | −37.3 | 17.7 | 1.2 | 0.6 |
| Yellow | 89.5 | −1.0 | 66.0 | 88.5 | 0.2 | 70.7 | 88.5 | 0.5 | 69.0 | 1.8 | 0.4 |
| Red | 45.4 | 69.7 | 39.9 | 44.1 | 72.9 | 45.1 | 44.0 | 72.7 | 45.6 | 0.5 | 0.3 |
| Blue | 30.3 | −9.8 | −37.7 | 27.6 | −11.4 | −38.7 | 27.2 | −12.0 | −38.1 | 0.9 | 0.4 |
| | | | | | | | | | Avg | 0.9 | 0.4 |
| | | | | | | | | | P95 | 1.6 | 0.6 |

Table 4 shows the predicted color and the measured color of the clear-coated swatches using the two-constant model (Equation 8).

TABLE 4

Color prediction performance of the two-constant model

| Swatch color | Uncoated, measured | | | Coated, measured | | | Coated, predicted | | | dE | dE00 |
|---|---|---|---|---|---|---|---|---|---|---|---|
| | L* | a* | b* | L* | a* | b* | L* | a* | b* | | |
| Black | 16.0 | 0.0 | 0.1 | 9.4 | 1.1 | 0.0 | 6.8 | 0.0 | 0.1 | 2.8 | 2.2 |
| Green | 39.4 | −35.0 | 15.6 | 37.0 | −37.2 | 16.5 | 37.1 | −39.4 | 17.5 | 2.4 | 0.8 |
| Yellow | 89.5 | −1.0 | 66.0 | 88.5 | 0.2 | 70.7 | 89.0 | −1.0 | 67.8 | 3.2 | 1.1 |
| Red | 45.4 | 69.7 | 39.9 | 44.1 | 72.9 | 45.1 | 43.5 | 73.0 | 46.4 | 1.4 | 0.7 |
| Blue | 30.3 | −9.8 | −37.7 | 27.6 | −11.4 | −38.7 | 26.8 | −11.7 | −41.2 | 2.6 | 0.9 |
| | | | | | | | | | Avg | 2.5 | 1.2 |
| | | | | | | | | | P95 | 3.1 | 2.0 |

As Tables 3 and 4 show, the error between the predicted and measured coated swatches for the spectral model may be significantly less than that of the simplified two-constant model. However, the two-constant model may provide advantages in computational simplicity and robustness, as discussed earlier.

Intermediate models, as discussed earlier, were also applied to these data. It was found that even a simple three-constant model provided excellent improvement in color prediction accuracy, virtually as good as the full spectral model. In this intermediate model, a linear function was used for $A(\lambda)$ and a constant was used for $B(\lambda)$ [$A(\lambda)=a_0+a_1*\lambda$ and $B(\lambda)=b_0$, where $a_0=0.74$, $a_1=0.00042$, and $b_0=-0.99$]. The performance of this three-constant model is shown in Table 5.

TABLE 5

Color prediction performance of the three-constant model

| Swatch color | Uncoated, measured | | | Coated, measured | | | Coated, predicted | | | dE | dE00 |
|---|---|---|---|---|---|---|---|---|---|---|---|
| | L* | a* | b* | L* | a* | b* | L* | a* | b* | | |
| Black | 16.0 | 0.0 | 0.1 | 9.4 | 1.1 | 0.0 | 9.4 | 1.2 | −0.2 | 0.3 | 0.3 |
| Green | 39.4 | −35.0 | 15.6 | 37.0 | −37.2 | 16.5 | 37.2 | −37.3 | 17.7 | 1.2 | 0.6 |
| Yellow | 89.5 | −1.0 | 66.0 | 88.5 | 0.2 | 70.7 | 88.5 | 0.5 | 69.0 | 1.8 | 0.4 |
| Red | 45.4 | 69.7 | 39.9 | 44.1 | 72.9 | 45.1 | 44.0 | 72.7 | 45.6 | 0.5 | 0.3 |
| Blue | 30.3 | −9.8 | −37.7 | 27.6 | −11.4 | −38.7 | 27.2 | −12.0 | −38.1 | 0.9 | 0.4 |
| | | | | | | | | | Avg | 0.9 | 0.4 |
| | | | | | | | | | P95 | 1.7 | 0.6 |

A processor (not shown) may be provided that is configured to measure the reflectance spectrum and/or the color of an uncoated print; and estimate the print when coated by a clear-coating process based on the uncoated color measurement using a function that correlates uncoated color measurements and coated color measurements by the clear-coating process. Similarly, the calibrating system may include a processor configured to correlate the color of the coated patches with the uncoated patches based on the coated and uncoated color patch measurements. The processors may be dedicated hardware, like a application-specific integrated circuit (ASIC) or field-programmable gate array (FPGAs), software, or combinations thereof. For different methods, the programming may vary.

According to yet another embodiment, associated software may be used in conjunction with the sensor to perform normalization of sensor readings. For instance, a computer-readable storage medium may include computer-readable instructions stored therein that when executed by a processor are configured to implement a method for estimating the color of a coated print.

While this disclosure has been described in connection with what is presently considered to be the most practical and preferred embodiment, it is to be understood that it is capable of further modifications and is not to be limited to the disclosed embodiments, and this disclosure is intended to cover any variations, uses, equivalent arrangements or adaptations of the inventive concepts following, in general, the principles of the disclosed embodiments and including such departures from the present disclosure as come within known or customary practice in the art to which the embodiments pertain, and as may be applied to the essential features hereinbefore set forth and followed in the spirit and scope of the appended claims.

What is claimed is:

1. A method for adjusting the color of a coated print comprising:

measuring the reflectance spectra of an uncoated print with a spectral measuring device to obtain an uncoated reflectance spectra measurement;

estimating, using a processor, the reflectance spectra of the print when coated by a coating process based on the uncoated reflectance spectra measurement using a correlating function;

determining, using the processor, differences between the estimated reflectance spectra of the coated print and reference reflectance spectra, wherein the reference reflectance spectra correspond to a desired color of an output image; and adjusting, using the processor, at least one parameter of a printing process based on the determined differences in reflectance spectra so as to achieve the desired color of the output image, wherein the correlating function is a multi-dimensional transformation in spectral space and the correlating function is a function of reflectance spectra of a plurality of color patches before and after the coating process, and wherein the reflectance spectra of the plurality of color patches before and after the coating process are measured at a range of wavelengths.

2. The method according to claim 1, wherein the correlating function is determined by:

measuring the color of a plurality of uncoated color patches to obtain reflectance spectra for the plurality of uncoated color patches;

measuring the color of the plurality of patches after the patches have been coated by the coating process to obtain reflectance spectra for the plurality of coated color patches; and correlating the color of the coated patches with the color of the uncoated patches based on the obtained reflectance spectra for the plurality of uncoated color patches and the obtained reflectance spectra for the plurality of coated color.

3. The method according to claim 1, wherein the correlating function is defined as $$S_c = M * S_p,$$

where
- $S_c$ represents the reflectance spectra of the coated color patches;
- $S_p$ represents the measured spectra of the uncoated color patches; and
- M* is a spectral transformation matrix.

4. The method according to claim 3, wherein the spectral transformation matrix M* is defined as:

$$M^* = \operatorname*{argmin}_M J = \operatorname*{argmin}_M \sum_{i=1}^{N} w(i) \|S_c^i M S_p^i\|^2$$

where $$w(i) = \frac{1}{d(i)^p + \varepsilon}; \; d(i) = \|S_c^i - S_p^i\|.$$

5. The method according to claim 3, wherein the spectral transformation matrix M* is defined as:

$$M^* = QP^{-1},$$

where $$Q = \sum_{i=1}^{N} w(i) S_c^i S_p^{iT};$$

and $$P = \sum_{i=1}^{N} w(i) S_p^i S_p^{iT}.$$

6. The method according to claim 1, wherein the correlating function is a physical model.

7. The method according to claim 6, wherein the correlating function is defined as $$R_C(\lambda) = R_U(\lambda) \cdot A(\lambda) + B(\lambda),$$

where $R_C(\lambda)$ and $R_U(\lambda)$ are the reflectance spectra of the coated and uncoated color patches, respectively; and $A(\lambda)$ and $B(\lambda)$ are experimentally-determined or estimated spectra.

8. The method according to claim 7, where one or both of the $A(\lambda)$ and $B(\lambda)$ spectra are approximated by simple functions relating $A(\lambda)$ and $B(\lambda)$ to wavelength $\lambda$.

9. The method according to claim 8, where the simple functions are polynomials of order 0, 1 or 2.

10. The method according to claim 9, wherein the correlating function is defined as $$R_C(\lambda) = a \cdot R_U(\lambda) + b$$

where $R_C(\lambda)$ and $R_U(\lambda)$ are the reflectance spectra of the coated and uncoated color patches, respectively; and a and b are scalar constants.

11. The method according to claim 6, wherein the correlating function is defined as $$X_C = X_U + X_G$$

$$Y_C = Y_U + Y_G,$$

$$Z_C = Z_U + Z_G$$

where
- $X_U$, $Y_U$, and $Z_U$ are the tristimulus values of the uncoated patches;
- $X_C$, $Y_C$, and $Z_C$ are the tristimulus values of the coated patches; and
- $X_G$, $Y_G$, and $Z_G$ are scalar constants.

12. The method according to claim 1, wherein the coating process comprises: an ultraviolet (UV) clear coat process, an aqueous clear coat process, or laminated clear coat finish process.

13. A system configured to adjust the color of a coated print comprising:
- a marking engine configured to render a color print;
- a sensor configured to measure the reflectance spectra of an uncoated print to obtain an uncoated reflectance spectra measurement; and
- a processor configured to
  - (i) estimate the reflectance spectra of the print when coated by a coating process, based on the uncoated reflectance spectra measurement, using a correlating function;
  - (ii) determine differences between the estimated reflectance spectra of the coated print and reference reflectance spectra, wherein the reference reflectance spectra correspond to a desired color of an output image; and
  - (iii) adjust at least one parameter of a printing process based on the determined differences in reflectance spectra so as to achieve the desired color of the output image,
- wherein the correlating function is a multi-dimensional transformation in spectral space and the correlating function is a function of reflectance spectra of a plurality of color patches before and after the coating process, and
- wherein the reflectance spectra of the plurality of color patches before and after the coating process are measured at a range of wavelengths.

14. The system according to claim 13, further comprising a calibration system, the calibration system comprising:
- a sensor configured to:
  - measure the color of a plurality of uncoated color patches to obtain reflectance spectra for the plurality of uncoated color patches; and
  - measure the color of the plurality of patches after the patches have been coated by the coating process to obtain reflectance spectra for the plurality of coated color patches; and
- a processor configured to correlate the color of the coated patches with the color of the uncoated patches based on the obtained reflectance spectra for the plurality of uncoated color patches and the obtained reflectance spectra for the plurality of coated color patches.

15. The system according to claim 13, wherein the correlating function is defined as:

$$S_c = M^* S_p,$$

where
- $S_c$ represents the reflectance spectra of the coated color patches;
- $S_p$ represents the measured reflectance spectra of the uncoated color patches; and
- M* is a spectral transformation matrix.

16. The system according to claim 15, wherein the spectral transformation matrix M* is defined as:

$$M^* = QP^{-1},$$

-continued where $$Q = \sum_{i=1}^{N} w(i) S_c^i S_p^{iT};$$

and $$P = \sum_{i=1}^{N} w(i) S_p^i S_p^{iT}.$$

17. The system according to claim 15, wherein the spectral transformation matrix M* is defined as:

$$M^* = \underset{M}{\arg\min} J = \underset{M}{\arg\min} \sum_{i=1}^{N} w(i) \|S_c^i M S_p^i\|^2$$

where $$w(i) = \frac{1}{d(i)^p + \varepsilon}; \quad d(i) = \|S_c^i - S_p^i\|.$$

18. The system according to claim 13, wherein the correlating function is a physical model.

19. The system according to claim 18, wherein the correlating function is defined as $$R_C(\lambda) = R_U(\lambda) \cdot A(\lambda) + B(\lambda),$$

where $R_C(\lambda)$ and $R_U(\lambda)$ are the reflectance spectra of the coated and uncoated color patches, respectively; and
$A(\lambda)$ and $B(\lambda)$ are experimentally-determined or estimated spectra.

20. The system according to claim 19, where one or both of the $A(\lambda)$ and $B(\lambda)$ spectra are approximated by simple functions relating $A(\lambda)$ and $B(\lambda)$ to wavelength $\lambda$.

21. The system according to claim 20, where the simple functions are polynomials of order 0, 1 or 2.

22. The system according to claim 21, wherein the correlating function is defined as $$R_C(\lambda) = a \cdot R_U(\lambda) + b$$

where $R_C(\lambda)$ and $R_U(\lambda)$ are the reflectance spectra of the coated and uncoated color patches, respectively; and
a and b are scalar constants.

23. The system according to claim 18, wherein the correlating function is defined as $$X_C = X_U + X_G$$

$$Y_C = Y_U + T_G,$$

$$Z_C = Z_U + Z_G$$

where
$X_U, Y_U,$ and $Z_U$ are the tristimulus values of the uncoated patches;
$X_C, Y_C,$ and $Z_C$ are the tristimulus values of the coated patches; and
$X_G, Y_G,$ and $Z_G$ are scalar constants.

24. The system according to claim 13, further comprising a coating apparatus configured to coat the print.

25. The system according to claim 24, wherein the coating apparatus comprises; an ultraviolet (UV) clear coat apparatus, an aqueous clear coat apparatus, or laminated clear coat finish apparatus.

26. The system according to claim 24, wherein the coating apparatus is inline or embedded with the marking engine.

* * * * *